US010540816B2

(12) United States Patent
Kuribara et al.

(10) Patent No.: US 10,540,816 B2
(45) Date of Patent: Jan. 21, 2020

(54) INFORMATION DISPLAY SYSTEM

(71) Applicant: FANUC CORPORATION, Yamanashi (JP)

(72) Inventors: Kouhei Kuribara, Yamanashi (JP); Kenji Shimizu, Yamanashi (JP); Kazuo Satou, Yamanashi (JP); Hideaki Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/876,764

(22) Filed: Jan. 22, 2018

(65) Prior Publication Data

US 2018/0211442 A1 Jul. 26, 2018

(30) Foreign Application Priority Data

Jan. 23, 2017 (JP) ................................. 2017-009193

(51) Int. Cl.
*G06T 15/00* (2011.01)
*G06T 17/20* (2006.01)
*H04N 13/332* (2018.01)
*G06T 19/00* (2011.01)

(52) U.S. Cl.
CPC ............ *G06T 17/20* (2013.01); *G06T 19/006* (2013.01); *H04N 13/332* (2018.05)

(58) Field of Classification Search
CPC ......... H04N 13/332; G06T 17/20; G06T 7/55; G06T 17/00; G06T 19/006
USPC ......................................................... 345/418
See application file for complete search history.

(56) References Cited

U.S. PATENT DOCUMENTS

| 9,019,266 | B2* | 4/2015 | Hoguet .................. G06Q 10/06 |
| | | | 345/419 |
| 9,430,871 | B2* | 8/2016 | Neophytou ........ G06K 9/00214 |
| 9,507,885 | B2* | 11/2016 | Yu ........................ G06F 17/5004 |
| 10,095,945 | B2* | 10/2018 | Wnuk ............... G06F 17/30268 |

(Continued)

FOREIGN PATENT DOCUMENTS

| CN | 104520905 A | 4/2015 |
| CN | 105229705 A | 1/2016 |

(Continued)

OTHER PUBLICATIONS

Ip, Cheuk Yiu, and Satyandra K. Gupta. "Retrieving matching CAD models by using partial 3D point clouds." Computer-Aided Design and Applications 4.5 (2007): 629-638.*

(Continued)

*Primary Examiner* — Phu K Nguyen
(74) *Attorney, Agent, or Firm* — Hauptman Ham, LLP

(57) ABSTRACT

Provided is an information display system configured to display auxiliary information in a real space in a superimposed manner, depending on the visibility of a workpiece. The information display system is provided with a mapping unit configured to photograph the workpiece and create model data indicative of the shape of the workpiece, a complementary unit configured to generate a 3D model image of at least a part of the workpiece based on 3D model data of the workpiece and complement an invisible part of the workpiece by the 3D model image, and a display unit configured to display the 3D model image so as to be superimposed on the invisible part of the workpiece.

6 Claims, 5 Drawing Sheets

(56) References Cited

U.S. PATENT DOCUMENTS

| | | |
|---|---|---|
| 2005/0068314 A1 | 3/2005 | Aso et al. |
| 2012/0328196 A1 | 12/2012 | Kasahara et al. |
| 2015/0213649 A1 | 7/2015 | Morishita et al. |
| 2016/0125654 A1 | 5/2016 | Shikoda et al. |
| 2016/0260261 A1 | 9/2016 | Hsu |
| 2019/0026955 A1 | 1/2019 | Ogata et al. |

FOREIGN PATENT DOCUMENTS

| | | |
|---|---|---|
| EP | 2509048 A2 | 10/2012 |
| JP | 2002-269546 A | 9/2002 |
| JP | 2012-19434 A | 1/2012 |
| JP | 2013-149042 A | 8/2013 |
| JP | 2013-159042 A | 8/2013 |
| JP | 2017-168077 A | 9/2017 |

OTHER PUBLICATIONS

Chang, Ming-Ching, and Benjamin B. Kimia. "Measuring 3D shape similarity by graph-based matching of the medial scaffolds." Computer Vision and Image Understanding 115, No. 5 (2011): 707-720.*

Li X, Godil A, Wagan A. 3D part identification based on local shape descriptors. InProceedings of the 8th Workshop on Performance Metrics for Intelligent Systems Aug. 19, 2008 (pp. 162-166). ACM.*

Fehr D, Beksi WJ, Zermas D, Papanikolopoulos N. Covariance based point cloud descriptors for object detection and recognition. Computer Vision and Image Understanding. Jan. 31, 2016;142:80-93.*

Office Action in Japanese Application No. 2017-009193, dated Jul. 17, 2018, 4pp.

Office Action in JP Application No. 2017-009193, dated Dec. 25, 2018, 6pp.

Office Action in CN Application No. 201810054940.7, dated Jul. 1, 2019, 13pp.

* cited by examiner

INFORMATION DISPLAY SYSTEM

RELATED APPLICATIONS

The present application claims priority to Japanese Patent Application No. 2017-009193 filed on Jan. 23, 2017, the disclosure of which is hereby incorporated by reference herein in its entirety.

BACKGROUND OF THE INVENTION

Field of the Invention

The present invention relates to an information display system, and more particularly, to an information display system configured to display auxiliary information in a real space in a superimposed manner, depending on the visibility of a workpiece.

Description of the Related Art

A mixed reality (MR) technology and a match move technology are known technologies. In the MR technology, information on a virtual space is displayed in a real space in a superimposed manner. In the match move technology, a moving image is synthesized with other images. For example, Japanese Patent Application Laid-Open No. 2002-269546 describes a system capable of automatically tracking the movement of a person's face in a moving image and synthesizing an image obtained by transforming the face image into a desired shape. Japanese Patent Application Laid-Open No. 2012-019434 describes a system capable of synthesizing an advertisement video and a main video by a tracking technique.

In the field of machining by machine tools, on the other hand, a problem arises that it is difficult to visually recognize the state of a workpiece being machined, due to obstruction by a shielding object, such as cutting oil or a soiled window of a protection door (see FIG. 1). For example, there is a desire to visually recognize the state of progress of the machining of the workpiece, presence of an air-cut (useless movement path of a tool), size of a machining tolerance (section covered before the tool actually engages the workpiece after the start of cutting feed), relationship between the workpiece and chips, tip position of the tool, and the like, if possible. Due to the above-described problem, however, it is currently difficult to recognize these particulars during the machining. Nowadays, therefore, the recognition is performed by temporarily suspending the supply of the cutting oil or by slightly opening the protection door and peeping through the resulting gap. However, these methods are problematic because the safety is poor and it takes time before the field of view is improved.

Accordingly, although these problems are expected to be solved by the MR technology or the match move technology described above, no specific solutions are disclosed in Japanese Patent Applications Laid-Open Nos. 2002-269546 and 2012-019434.

SUMMARY OF THE INVENTION

The present invention has been made in consideration of these problems and its object is to provide an information display system configured to display auxiliary information in a real space in a superimposed manner, depending on the visibility of a workpiece.

An information display system according to one embodiment of the present invention comprises a mapping unit configured to photograph a workpiece and create model data indicative of the shape of the workpiece, a complementary unit configured to generate a 3D model image of at least a part of the workpiece based on 3D model data of the workpiece and complement an invisible part of the workpiece by the 3D model image, and a display unit configured to display the 3D model image so as to be superimposed on the invisible part of the workpiece.

An information display system according to another embodiment further comprises a match move unit configured to perform match move processing for the model data and the 3D model image.

In an information display system according to another embodiment, the complementary unit performs the complementation by collating respective feature points of the model data and the 3D model.

In an information display system according to another embodiment, the mapping unit creates model data of the workpiece and surroundings of the workpiece, and the complementary unit performs the complementation by using the model data of the surroundings.

According to the present invention, there can be provided an information display system configured to display auxiliary information in a real space in a superimposed manner, depending on the visibility of a workpiece.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An embodiment of the present invention will now be described with reference to the accompanying drawings.

Figure 3:
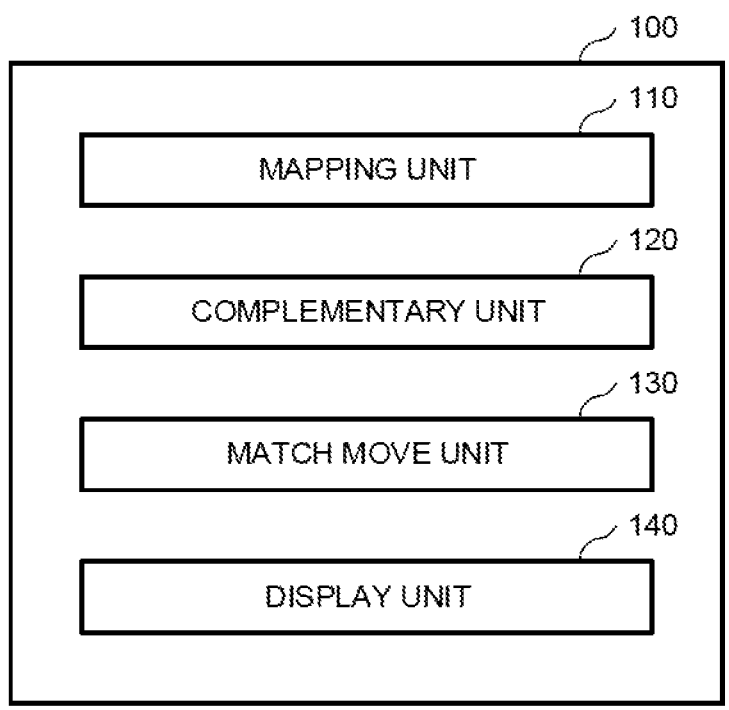
FIG. 3 is a block diagram showing a configuration of the information display system.

FIG. 3 is a block diagram showing a configuration of an information display system 100 according to the embodiment of the present invention. The information display system 100 comprises a mapping unit 110, complementary unit 120, match move unit 130, and display unit 140. The information display system 100 is an information processor that typically comprises a central processing unit (CPU), storage device, and input and output devices, such as an imaging device and a display device, and those various processing units are logically implemented as the CPU executes a predetermined program. For example, the information display system 100 may be a smartphone, tablet terminal, head-mounted display (HMD), or the like that is provided with a display configured to serve as the display unit 140 and has the CPU and the storage device built-in. Alternatively, the information display system 100 may be constructed by connecting the display or the HMD that serves as the display unit 140 to a computer that is provided with the CPU and the storage device.

The mapping unit 110 acquires an image by photographing an object or the like that exists in the real world and performs processing for generating model data of the object contained in the image, that is, data indicative of the shape of the object. In the present embodiment, a moving image of a workpiece being machined is picked up and model data of the workpiece contained in the moving image is created. The moving image is picked up by means of a camera attached to the HMD, for example. Since the method for creating the model data from the image is generally known, a detailed description thereof is omitted herein. Typically, the model data to be generated is wireframe data. Alternatively, it may be a simple set of feature points extracted from the image.

The complementary unit 120 complements the model data generated by the mapping unit 110 by a 3D model of the workpiece and performs processing for causing the display unit 140 to display it. Specifically, the complementary unit 120 previously holds 3D model data (typically CAD data or NC data) of the workpiece in a storage area (not shown) and performs rendering such that the 3D model data is superimposed on model data created based on an actual workpiece. In the present embodiment, if a part of the workpiece is made invisible by a shielding object, such as cutting oil or a protection door, 3D data of the invisible part is rendered.

The match move unit 130 performs processing for linking the model data generated by the mapping unit 110 with the 3D model displayed by the complementary unit 120. Specifically, the match move unit 130 tracks the model data and adjusts the display position, direction and the like of the 3D model. Thus, the 3D model to be complemented follows the workpiece even if the camera for capturing the workpiece is moved, so that the state of the workpiece or the like can be continuously observed. Since the specific procedure of match move processing is generally known, a detailed description thereof is omitted herein.

Figure 1:
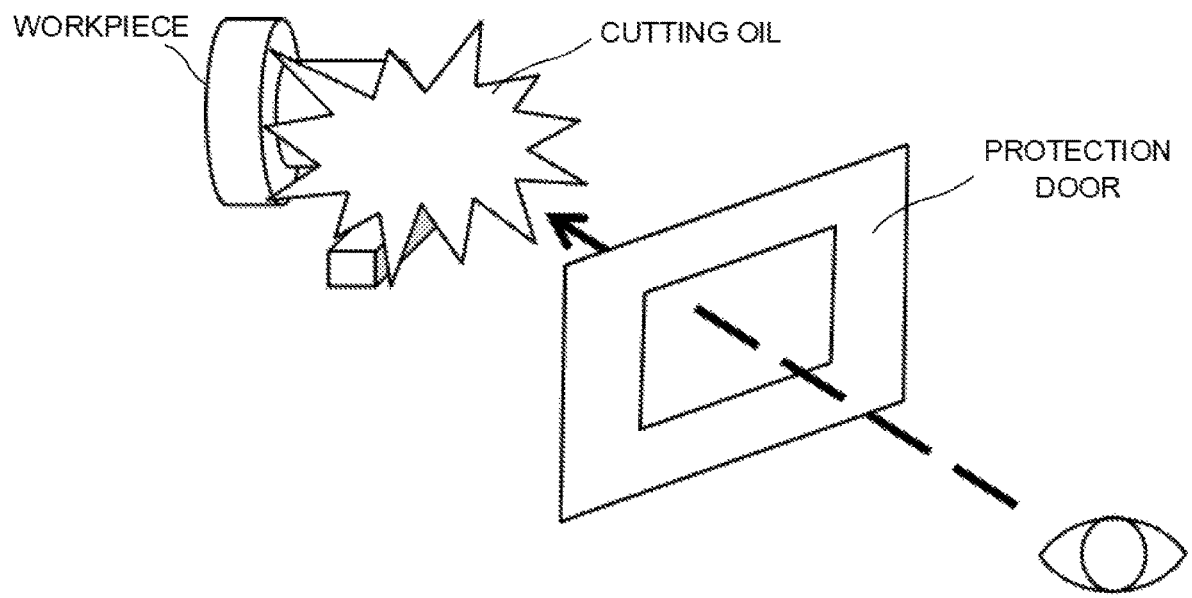
FIG. 1 is a diagram showing a problem of the prior art.
Figure 2:
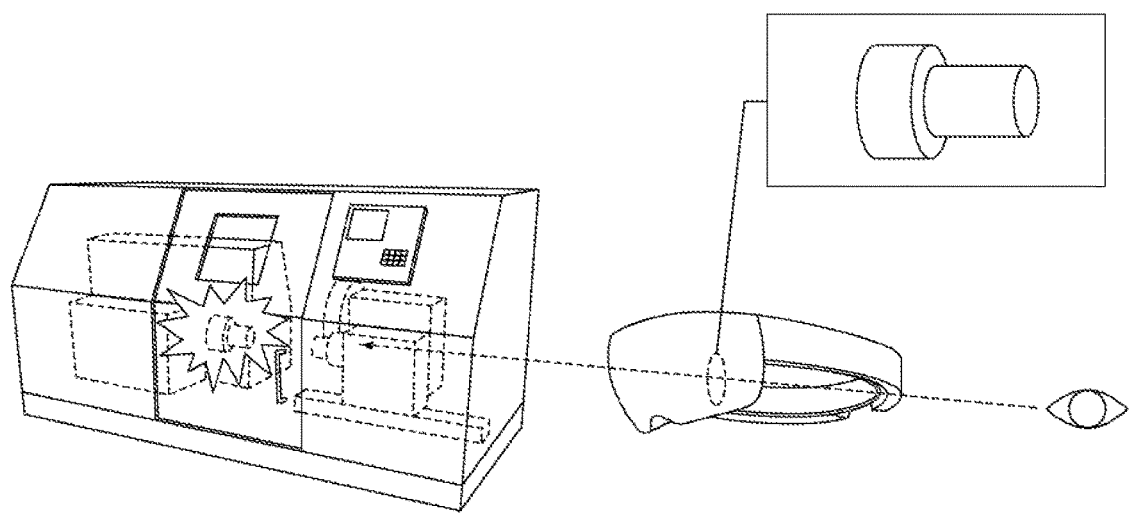
FIG. 2 is a schematic diagram showing a practical example of an information display system.

The display unit 140 is a display device that can visually recognize the actual workpiece and the 3D model generated by the complementary unit 120 in a superimposed manner. For example, the display unit 140 is an HMD equipped with a camera (see FIG. 2). In the case of a non-transmission-type HMD, an image captured by the camera is displayed on a projection surface.

In the case of a transmission-type HMD, a field of view equivalent to the image captured by the camera can be visually recognized through a transparent projection surface. While the mapping unit 110 creates the model data based on the image captured by the camera, the model data need not be displayed on the display unit 140 and is held in a predetermined storage area and used for complementary processing and the match move processing. On the other hand, the display unit 140 displays the 3D model rendered by the complementary unit 120 on the projection surface. In this way, a user is enabled to visually recognize the actual workpiece that is projected on the projection surface or visually recognized through the projection surface and 3D data projected on the projection surface in a superimposed manner.

Figure 4:
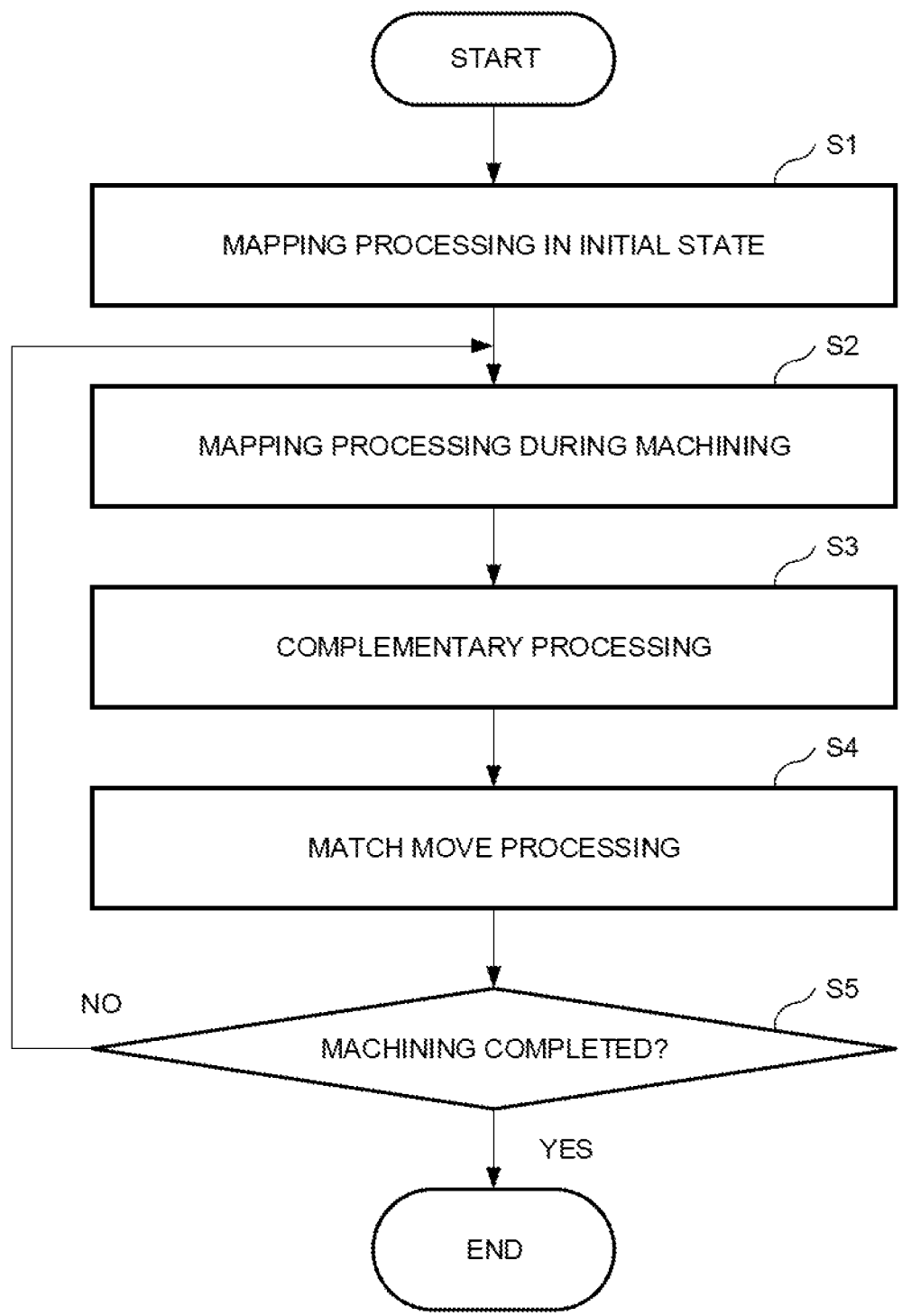
FIG. 4 is a flowchart showing an operation of the information display system.

FIG. 4 is a flowchart showing an operation of the information display system 100.

S1: Mapping Processing (Initial State)

First, the mapping unit 110 acquires an image of the workpiece before machining by using an image-pickup means such as a camera. When this is done, it is preferable to acquire the image of the entire workpiece. The complementary processing and the match move processing in the subsequent stage can be precisely performed by previously acquiring a large number of feature points at various parts of the workpiece.

It is more preferable to acquire not only the image of the workpiece but those of its surroundings, e.g., a table for carrying the workpiece and the housing of a machine tool. Thus, even in case the workpiece cannot be visually recognized at all, the complementary processing and the match move processing in the subsequent stage can be performed if the surroundings of the workpiece can be visually recognized. In general, the table, the housing of the machine tool, and the like are preferable surroundings to be photographed, since they do not change their positions relative to the workpiece being machined. Otherwise, those surroundings to be photographed whose positions relative to the workpiece can be identified are preferable even though their relative positions are changeable. Although the position of, for example, a tool changes during machining, it can be identified based on a machining program or the like at a certain point in time.

The mapping unit 110 recognizes the workpiece in a photographed image and creates the model data of the workpiece. Typically, the mapping unit 110 extracts three-dimensional feature points individually from the previously held 3D model of the workpiece and the photographed image and collates them. Then, it extracts and saves only those feature points in the image which correspond to the feature points of the 3D model. Preferably, the mapping unit 110 extracts the feature points also from the surroundings of the workpiece. Then, it saves a data set including the feature points of the workpiece and those of the surroundings.

S2: Mapping Processing (During Machining)

Then, the mapping unit 110 acquires an image of the workpiece being machined by using the image-pickup means such as the camera and extracts the feature points of the workpiece being machined in the same manner as in Step S1. Preferably, the mapping unit 110 extracts the feature points also from the surroundings of the workpiece.

S3: Complementary Processing

The complementary unit 120 compares the feature points of the workpiece acquired in Step S2 and those of the previously held 3D model of the workpiece. If the comparison indicates that there is a part that lacks in the feature points of the workpiece acquired in Step S2, that part can be said to be the part made invisible by the shielding object.

Figure 5:
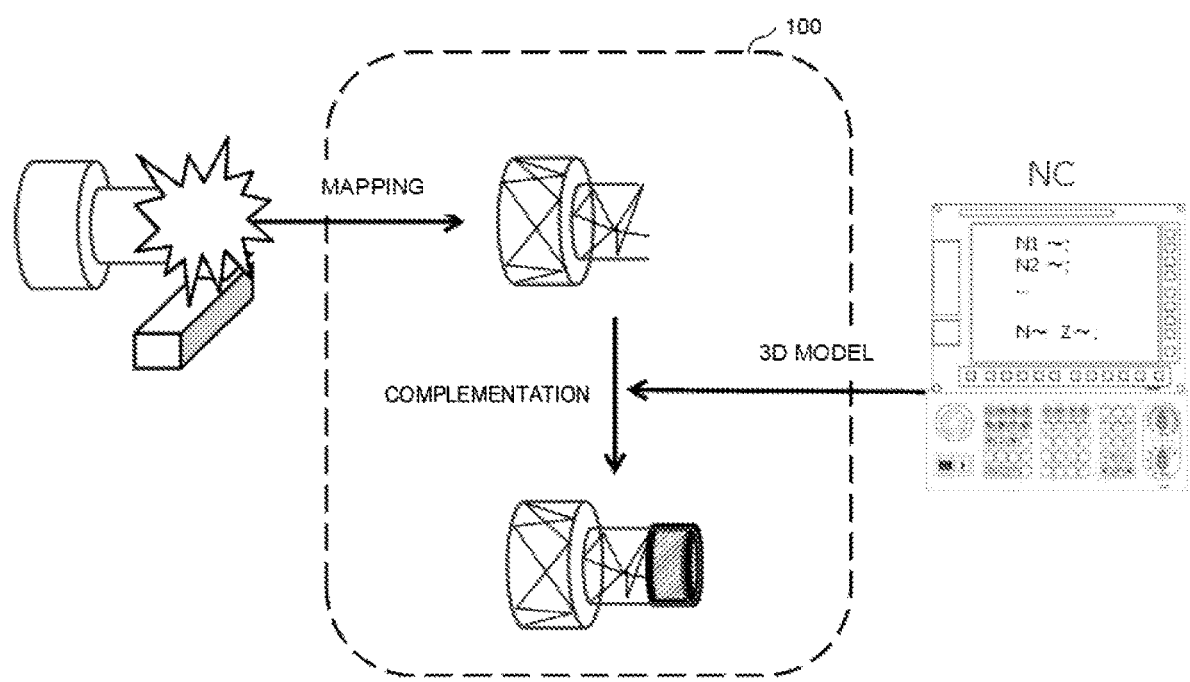
FIG. 5 is a schematic diagram showing an operation example of the information display system.

Thereupon, the complementary unit 120 renders only that part of the 3D model which corresponds to the invisible part of the workpiece. Specifically, it renders a partial 3D model including the feature points on the 3D-model side corresponding to the feature points that are deficient on the image side. The complementary unit 120 causes the display unit 140 to display the generated partial 3D model. Here the complementary unit 120 identifies those feature points which are included in the feature points of the workpiece acquired in Step S1 but are not included in the feature points of the workpiece acquired in Step S2. These are feature points that should have existed in the invisible part. The complementary unit 120 compares the feature points that should have existed in the invisible part with the feature points of the previously created partial 3D model, and locates the partial 3D model so that their relative positions are substantially coincident. Consequently, the partial 3D model is displayed so as to complement the invisible part of the actual workpiece (see FIG. 5).

Figure 6:
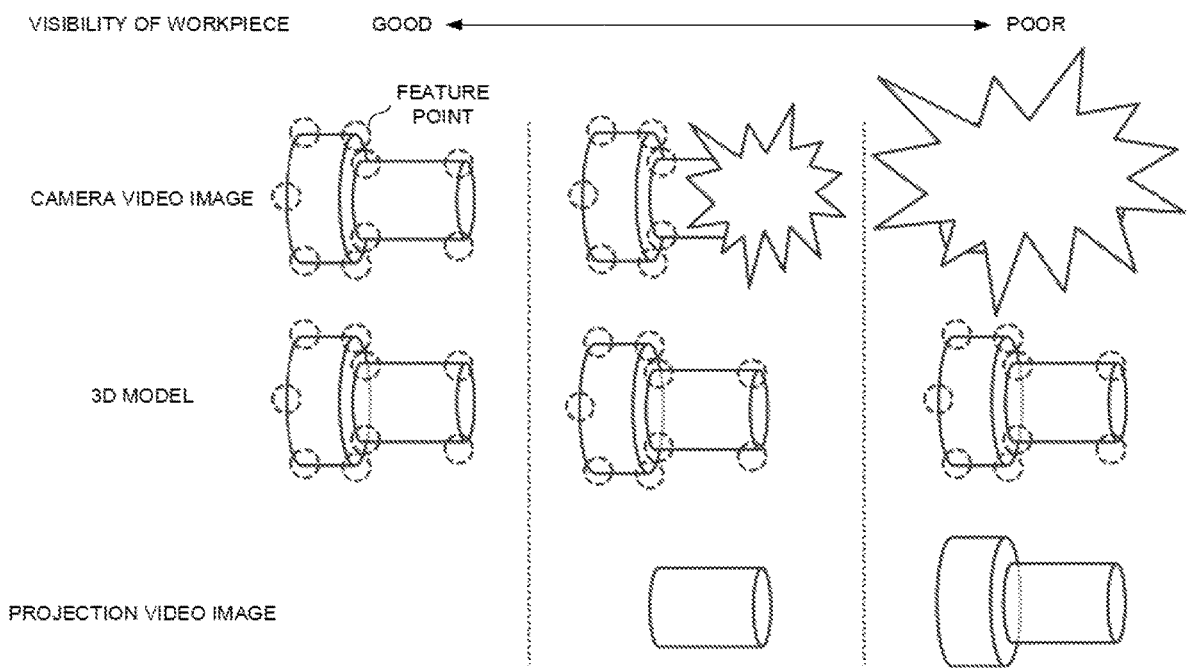
FIG. 6 is a schematic diagram showing an operation example of the information display system.

FIG. 6 is a diagram showing how a projection part of the 3D model formed by the complementary unit 120 changes depending on the conformity of the visibility of the workpiece, that is, on the size of the invisible part of the workpiece. If the visibility of the workpiece is so high that there is no invisible part, as shown on the left side of FIG. 6, the 3D model is not projected. If a part of the workpiece is missing, as shown in the central part of FIG. 6, the partial 3D model corresponding to the missing part is projected. If the workpiece is almost entirely invisible, as shown on the right side of FIG. 6, the entire 3D model is projected.

If the workpiece is almost entirely invisible, as shown on the right side of FIG. 6, or if the feature points that can be extracted from the image of the workpiece are so few that the position in which the 3D model is located cannot be identified, the complementary unit 120 can determine the position of the 3D model based on the feature points of the surroundings of the workpiece. Specifically, the image of the workpiece including the surroundings is acquired in Step S1 so that the relative positions of the workpiece and the surroundings can be identified. Then, an image including the surroundings is also acquired in Step S2 and differences in feature points between this image and the image acquired in Step S1 are obtained. In this way, the positions at which the feature points of the workpiece should exist can be identified. The complementary unit 120 locates the 3D model so as to cover these positions.

S4: Match Move Processing

The match move unit 130 performs processing for causing the 3D model rendered in Step S3 to be followed by a conventional method, in accordance with the change of the position of the workpiece in the image.

S5: Repetition for Each Predetermined Time

Preferably, the information display system 100 repeats the processing related to Steps S2 to S4 for each predetermined time. Consequently, the change of the visibility of the workpiece can be followed in real time to enable appropriate superimposed display of the 3D model.

According to the present invention, if a part or whole of the actual workpiece is made invisible by the shielding object such as the cutting oil or the protection door, the information display system 100 generates the partial 3D model corresponding to the invisible part and displays the generated 3D model so as to be superimposed on the invisible part of the actual workpiece. Consequently, the state of progress of the machining of the workpiece, presence of an air-cut (useless movement path of the tool), size of a machining tolerance (section covered before the tool actually engages the workpiece after the start of cutting feed), relationship between the workpiece and chips, tip position of the tool, and the like can be recognized by the 3D model even in a condition unfit for visual recognition.

The present invention is not limited to the above-described embodiment and may be suitably changed without departing from the spirit of the invention. Any of the constituent elements of the embodiment may be modified or omitted without departing from the scope of the present invention.

For example, although mainly the invisible part of the workpiece is replaced with the 3D model for display in the above-described embodiment, the application destination of the present invention is not limited to the workpiece. For example, 3D models can also be created and displayed in a superimposed manner for the tool (tip portion thereof, in particular), a part of the machine tool, and the like.

Moreover, in displaying the partial 3D model on the actual workpiece in a superimposed manner, processing may be performed to increase the transparency of a part that defines the boundary to the actual workpiece, as shown in the lower central portion of FIG. 6.

Consequently, the actual workpiece and the partial 3D model can be more seamlessly displayed in a superimposed manner.

Furthermore, in the above-described embodiment, the complementary unit 120 identifies, in Step S3, the invisible part of the workpiece by comparing the feature points of the workpiece acquired in Step S2 and those of the previously held 3D model of the workpiece. Alternatively, however, the invisible part of the workpiece can also be identified by comparing the feature points of the workpiece acquired in Step S2 and those of the workpiece acquired in Step S1. Specifically, it is necessary only that the feature points of the entire workpiece and those of the partially invisible workpiece be able to be compared. Moreover, although the example in which the HMD is used as the display unit 140 is mainly described in the above-described embodiment, the present invention is not limited to this. For example, a display capable of displaying the moving image picked up by the camera, a transmission-type protective cover window capable of directly visually recognizing the workpiece and also projecting the 3D model, or the like may alternatively be used as the display unit 140.

While an embodiment of the present invention has been described herein, the invention is not limited to the above-described embodiment and may be suitably modified and embodied in various forms.

The invention claimed is:

1. An information display system, comprising:
   a mapping unit configured to
      photograph a workpiece during machining by a machine tool, and
      create first model data indicative of a shape of the workpiece during the machining;
   a complementary unit configured to
      compare the first model data with second model data to identify an invisible part of the workpiece, the invisible part being a difference between the first model data and the second model data representing 3D model data of the workpiece during the machining calculated based on NC data, and
      generate a 3D model image of the invisible part of the workpiece; and
   a display unit configured to display the 3D model image so as to be superimposed on the invisible part of the workpiece during the machining.

2. The information display system according to claim 1, further comprising
   a match move unit configured to perform match move processing for the first model data and the 3D model image.

3. The information display system according to claim 1, wherein
   the complementary unit is configured to compare the first model data with second model data by collating respective feature points of the first and second model data.

4. The information display system according to claim 3, wherein
   the mapping unit is configured to create model data of the workpiece and surroundings of the workpiece, and
   the complementary unit is configured to, using the model data of the surroundings, determine positions of the feature points.

5. The information display system according to claim 1, wherein
when displaying the 3D model image as being superimposed on the invisible part of the workpiece, the display unit is configured to increase a transparency of a part that defines a boundary to the workpiece.

6. An information display system, comprising:
a camera configured to photograph a workpiece;
a processor configured to
create, from a photographed image of the workpiece, first model data indicative of a shape of the workpiece during machining by a machine tool,
compare the first model data with second model data to identify an invisible part of the workpiece, the invisible part being a difference between the first model data and the second model data representing 3D model data of the workpiece during the machining calculated based on NC data, and
generate a 3D model image of the invisible part of the workpiece;
and
a display configured to display the 3D model image as being superimposed on the invisible part of the workpiece during the machining.

* * * * *